(12) United States Patent
Kim

(10) Patent No.: US 7,318,246 B2
(45) Date of Patent: Jan. 15, 2008

(54) END CLIP OF VEHICLE WIPER BLADE

(75) Inventor: Ill-Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 37 days.

(21) Appl. No.: 11/289,195

(22) Filed: Nov. 28, 2005

(65) Prior Publication Data

US 2006/0107485 A1 May 25, 2006

(51) Int. Cl.
*B60S 1/38* (2006.01)
(52) U.S. Cl. .............................. 15/250.43; 15/250.453; 15/250.201
(58) Field of Classification Search .............. 15/250.43, 15/250.44, 250.451, 250.452, 250.453, 250.454, 15/250.201, 250.361
See application file for complete search history.

(56) References Cited

U.S. PATENT DOCUMENTS 6,119,302 A * 9/2000 Egner-Walter et al. .. 15/250.44

6,668,419 B1 * 12/2003 Kotlarski ................. 15/250.43

FOREIGN PATENT DOCUMENTS

| DE | 3842586 | * | 7/1989 |
| WO | WO 03/033316 | * | 4/2003 |
| WO | WO 2004/056623 | * | 7/2004 |

* cited by examiner

*Primary Examiner*—Gary K. Graham
(74) *Attorney, Agent, or Firm*—Peter F. Corless; Edwards, Angell, Palmer & Dodge LLP

(57) ABSTRACT

The present invention includes clips elements that are advantageously employed with vehicle wiper blades. Particularly preferred clip elements may comprise a clip body inserted into a tip of a wiper blade, and a latching cover rotatably installed at the clip body. In preferred aspects, the latching cover can be releasably secured to the clip body and can prevent the clip body from being withdrawn from the tip of a wiper blade during a secured state. When a user rotates the latching cover after releasing the latching cover from the clip body, the overall clip can easily be detached from the tip of the blade, thereby enabling economical part replacement.

3 Claims, 4 Drawing Sheets

END CLIP OF VEHICLE WIPER BLADE

CROSS-REFERENCE TO RELATED APPLICATIONS

The present application is based on, and claims priority from, Korean Application Serial Number 10-2004-0096665, filed on Nov. 24, 2004, the disclosure of which is hereby incorporated by reference herein in its entirety.

FIELD OF THE INVENTION

The present invention relates to an end clip of an automobile wiper blade adapted to replace the rubber of the wiper blade.

BACKGROUND OF THE INVENTION

A blade called an aero blade having vertebras (metallic support plates) at either side of the rubber has been disclosed in recent vehicles instead of a prior steel wiper blade.

The aero blade includes a spoiler that covers upper portions of the vertebras and rubber for preventing the blade from being damaged due to the driving wind or the like.

The aero blade can be remarkable in cleaning the windshield along the curve-shaped windshield by the operation of the spoiler, thus possessing a superior wiping function even during the winter, aesthetic appearance, and a clear visibility by lowering the height of the blade.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, systems are provided that enable selective and single-component replacement of the wiper blade rubber that directly contacts the windshield of a vehicle. By such single-component replacement (rather than e.g. replacement of the entire wiper blade unit), repair and replacement costs can be notably reduced.

More particularly, in a preferred aspect, an end clip of a vehicle wiper blade for replacing a rubber thereof is provided, wherein the end clip is installed at both ends of the wiper blade that comprises rubber, vertebra, and spoiler elements. The end clip preferably includes a clip body that can be inserted onto a tip of the blade for suitably enclosing the upper portion of a tip of each of rubber, vertebra, and spoiler elements. A latching cover is preferably rotatably installed in relation to a hinge coupling portion at an opening formed at an upper surface of the clip body to thereby open and close the opening. The latching cover preferably can be locked or otherwise affixed to the clip body while the opening is in a closed state to thereby provide a securing or locking structure. The clip body preferably can be prevented from being detached from the tip of the blade during the secured state to thereby provide a coupling structure.

A securing or locking structure of the end clip may include e.g. latching hooks that suitably extend at a bottom of both sides of the latching cover and are secured to the clip body. Such latching hooks can be stuck or otherwise in communication with and secured at latching surface such as latching jaws of the interior of the opening. In a particularly preferred system, if both sides of the latching cover are inwardly pressed, the latching hooks can escape or release from the securing jaws for releasing the secured state thereof.

The coupling structure of the end clip preferably includes a latching pin that is extended downward from the inside of the latching cover and is inserted into a hole of an upper surface of the rubber during the locked state of the latching cover. A latching member suitably is upwardly protruded on the vertebra and is stuck at a lateral side of the latching pin during the locked state of the latching cover.

Both ends of the latching member, which is preferably formed in a substantially U-shape such as the shape of "⌐⌐", are welded or otherwise affixed on the vertebras.

The invention also includes vehicular wiper blades that comprise one or more end clips as described herein.

It is understood that the term "vehicle" or "vehicular" or other similar terms as used herein is inclusive of motor vehicles in general such as passenger automobiles, buses, trucks, various commercial vehicles, watercraft including a variety of boats, aircraft, and the like.

It is also understood that unless indicated otherwise references herein to the "rubber" blade of a wiper unit are not limited to actual rubber material, but inclusive of any material that may be used in a wiper blade such as synthetic rubbers, plastics, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

As discussed above, in one aspect, end clips for use with vehicle windshield wiper blades are provided. Preferred end clips comprise a clip body that can be inserted onto a wiper blade such an end portion of a wiper blade. Preferably, an end clip also includes a latching cover which in positioned in a movably (e.g. rotatably) with respect to a hinge coupling portion. The hinge coupling portion is preferably positioned at a clip body opening to thereby enable maintaining the opening in open and closed states. Further, preferred end clips also may comprise a securing or locking structure in which the latching cover is secured to the clip body while the opening is in a closed state. Also, preferred end clips may comprise a coupling structure in which the clip body can be prevented or otherwise inhibited from being detached from a wiper blade.

The present end clips are preferably employed with wiper blade elements that include rubber element(s), vertebra element(s) and spoiler element(s), such as the so-called aero blades.

Figure 1:
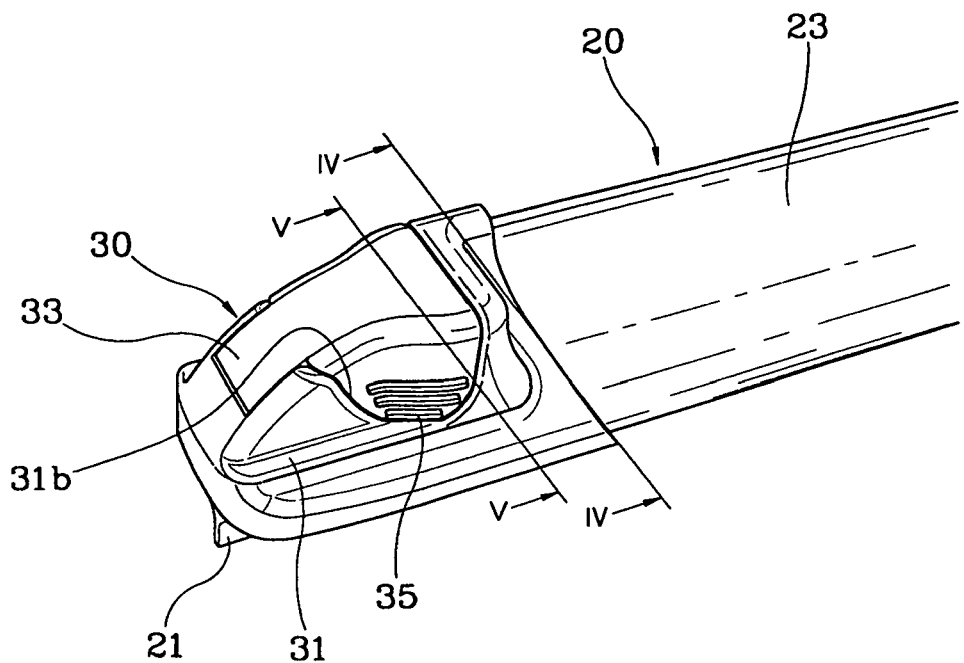
FIG. 1 illustrates an end clip assembly in accordance with an embodiment of the present invention.
Figure 2:
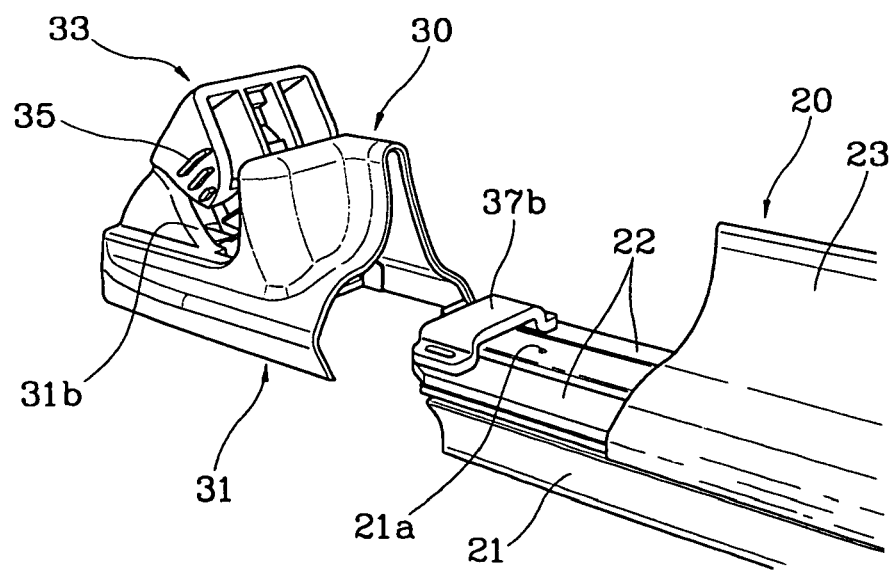
FIG. 2 is a perspective view of an end clip detached from a tip of a blade in accordance with the embodiment of the present invention.
Figure 3:
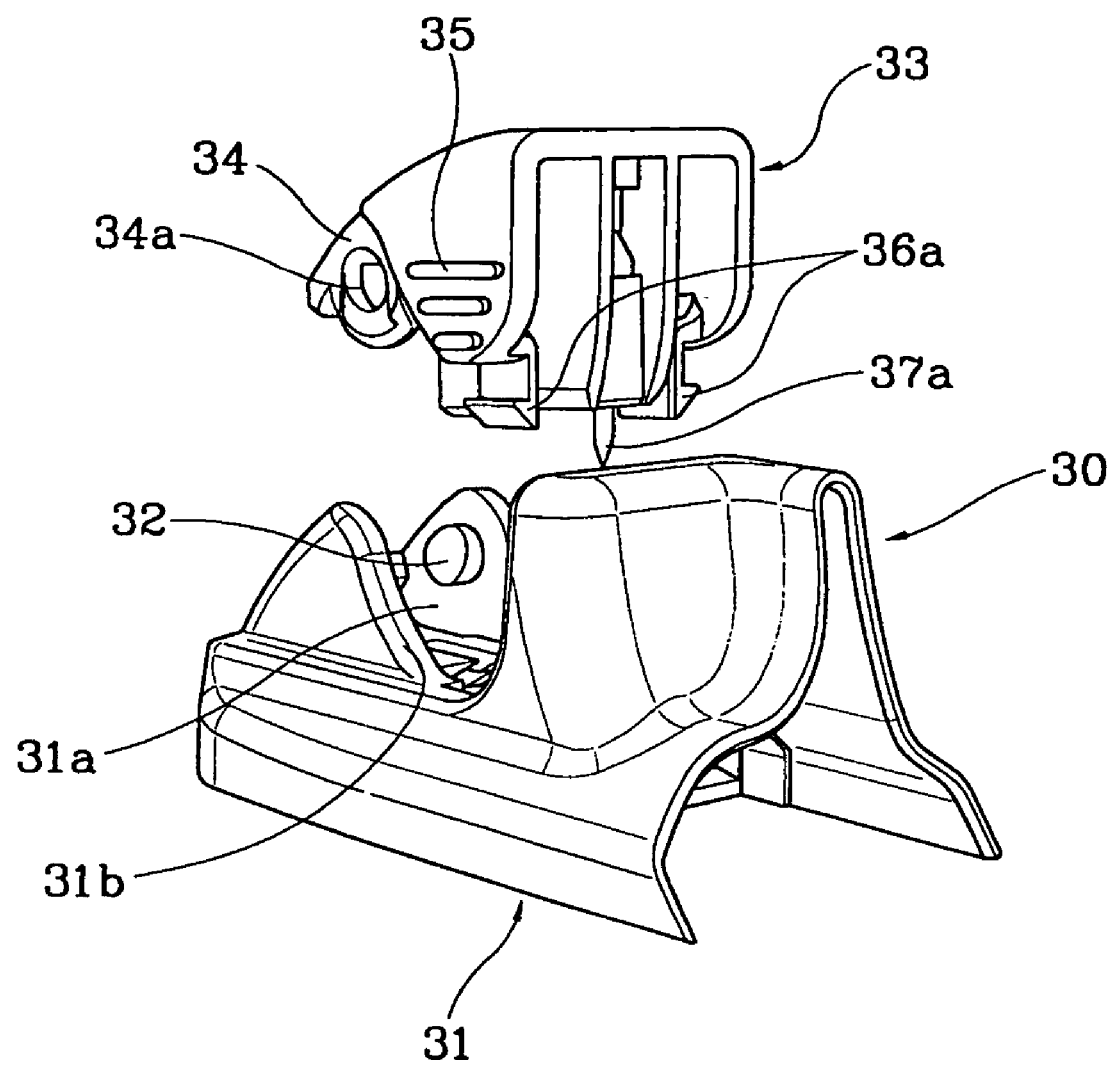
FIG. 3 is a perspective view of a latching cover detached from the clip body of the end clip in accordance with the embodiment of the present invention.
Figure 4:
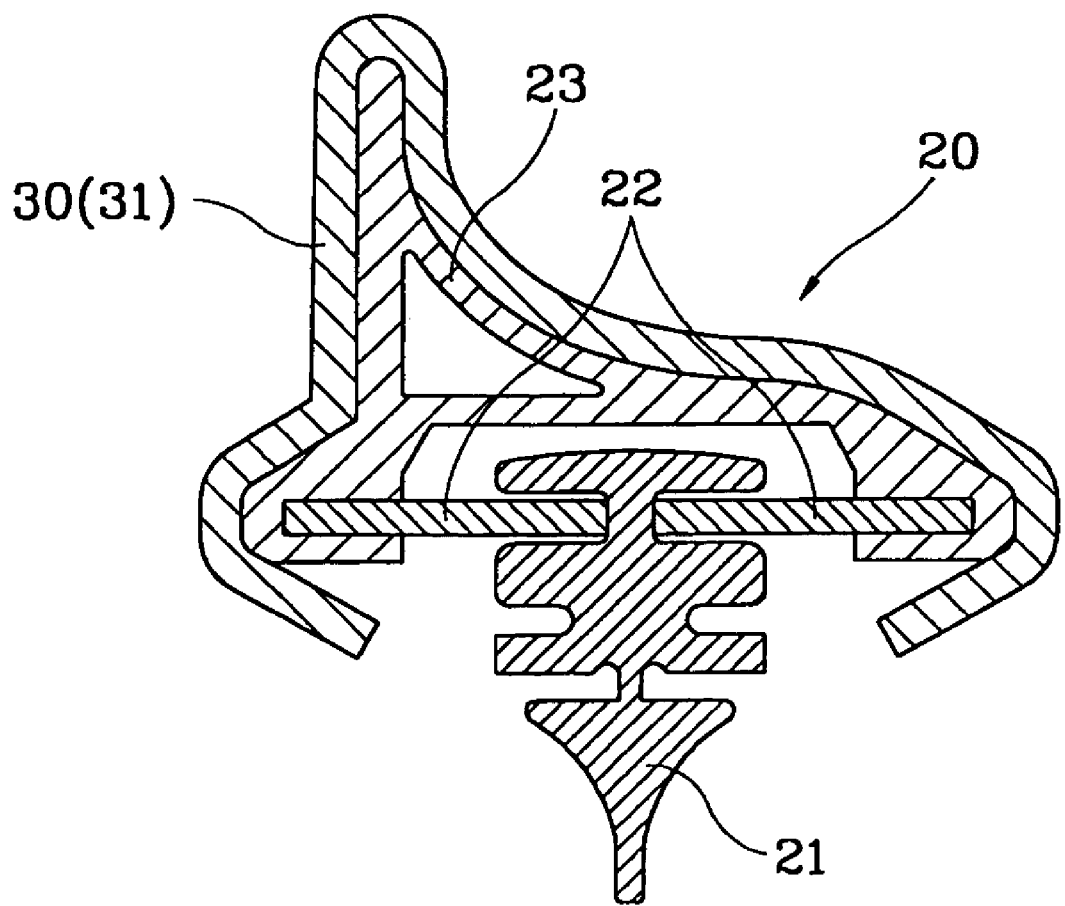
FIG. 4 is a cross-sectional view taken along line IV-IV of FIG. 1.
Figure 5:
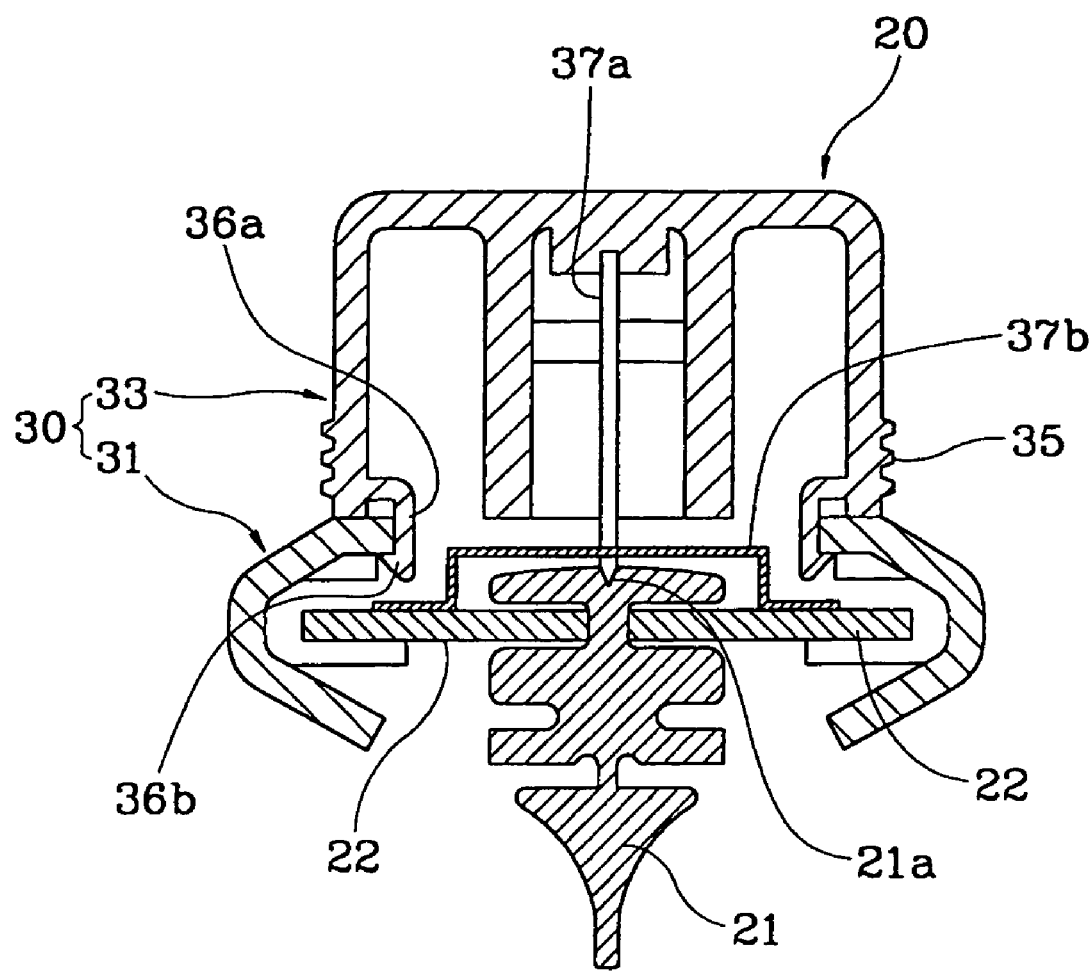
FIG. 5 is a cross-sectional view taken along line V-V of FIG. 1.

Referring now to FIGS. 1 to 5, an end clip 30 according to an embodiment of the present invention includes a clip body 31 fitted onto a tip of a blade 20. A latching cover 33 is preferably rotatably installed at clip body 31 and suitably can be locked with or released from the clip body. When latching cover 33 is in a secured or locked state with clip body 31, latching cover 33 can prevent or at least inhibit clip body 31 from being released from the tip of blade 20.

Clip body 31 preferably is fitted to enclose the upper portion of a tip of each spoiler 23, rubber 21, and vertebras 22. Therefore, when preferred clip body 31 is completely fitted, the upper portion of one end of spoiler 23 is covered by the end of clip body 31 having a similar configuration with the spoiler.

Clip body 31 can be formed with an opening 31a at the top thereof. A hinge pin 32 is suitably formed at the rear inner side of opening 31a and is inserted into a pinhole 34a of latching cover 33. Latching cover 33 is, therefore, rotatably coupled at opening 31a via hinge pin 32 and pin hole 34a.

Clip body 31 preferably is also formed with a knob groove 31b preferably shaped in accordance with a knob 35 of latching cover 33. If opening 31a is completely closed by latching cover 33, knob 35 of latching cover 33 is introduced into knob groove 31b.

Latching cover 33 thus is preferably rotatably installed at opening 31a of clip body 31 in relation to a hinge coupling portion 34. The opening 31a can be opened and closed by latching cover 33. In particular, when the opening 31a is in a closed state, latching cover 33 is locked with clip body 31. Simultaneously, latching cover 33 can function to prevent or at least inhibit clip body 31 from being detached from rubber 21 and vertebras 22.

Hinge coupling portion 34 preferably has at both sides thereof pin hole 34a into which relevant hinge pin 32 of clip body 31 is inserted. Hinge coupling portion 34 suitably is formed at the rear of latching cover 33. Thus, by this arrangement, when hinge coupling portion 34 is placed at an inner lateral surface of clip body 31, hinge pin 32 of clip body 31 is inserted into pin hole 34a. This permits latching cover 33 to be rotatably coupled at clip body 31.

Latching hooks 36a may extend at the bottom of both inner lateral surfaces of latching cover 33 for being secured such as locked to clip body 31. While latching cover 33 rotates downwardly to at least substantially or completely close opening 31a, latching hooks 36a are affixed or stuck and thereby secured or locked at latching elements or jaws 36b located at the interior of opening 31a of clip body 31.

By this preferred arrangement, while latching hooks 36a are in a secured state, if the user pushes both sides of latching cover 33 inwardly, latching hooks 36a can be released from latching jaws 36b. Hence, both sides of latching cover 33 can function as knob 35 for releasing the secured state.

By a preferred arrangement, knob 35 can fit in knob groove 31b of clip body 31 when latching cover 33 rotates downwardly.

A latching pin 37a can be inserted into rubber 21 and can be extended downward from the inner middle surface of latching cover 33 for preventing end clip 30 from being separated from the tip of blade 20 while latching cover 33 is in a secured state with clip body 31. Latching pin 31a suitably can be fabricated from a variety of materials including steel or other hard material such as another metal or plastic.

Under the above described secured or locked state, latching pin 37a is suitably inserted into a hole 21a formed at the upper surface of rubber 21. A latching member 37b of vertebra 22 is stuck at a lateral side of latching pin 37a at the same time. As a result, the overall end clip 30 is prevented from being separated from the tip of blade 20 by latching pin 37a.

Latching member 37b may suitably protrude upward on vertebras 22 and is fastened thereon by way of welding or other attachment for preventing latching pin 37a of latching cover 33 from being removed. Latching pin 31b suitably can be fabricated from a variety of materials including steel or other hard material such as another metal or plastic.

In particularly preferred aspects, both ends of latching member 37b may have a shape that facilitates attachment such as a substantially U-shape that preferably includes flanges for further affixing the member, e.g. a shape at least substantially corresponding to "⌐⌐". In a preferred aspect, member 37b can be welded or otherwise attached to one or more vertebras such as two vertebras 22.

A particularly preferred process for replacing a wiper blade rubber element using a present end clip can be conducted as follows.

If the user presses knob 35 inwardly and lifts latching cover 33 up, latching hooks 36a of latching cover 33 are released from latching jaws 36b of clip body 31 and latching cover 33 rotates upward in relation to hinge coupling portion 34.

When latching cover 33 is substantially or completely rotated, latching pin 37a is released from hole 21a of rubber 21 and is placed above latching member 37b of vertebra 22. Then, end clip 30 is completely detached from the tip of blade 20.

Next, rubber 21 and vertebras 22 are distanced from spoiler 23, and vertebras 22 are separated from rubber 21 in order to replace the rubber with a new rubber element. The assembly of new rubber element 21 and vertebra 22 is re-inserted into spoiler 23.

End clip 30 is assembled to both ends of blade 20 in the reverse steps from the above detaching process to thereby complete replacement of rubber 21.

In case latching cover 33 is pressed and rotated downward after each end clip 30 is inserted onto the relevant end of blade 20, then latching cover 33 is locked to clip body 31. Simultaneously, latching pin 37a is inserted into hole 21a of rubber 21 and end clip 30 is coupled to the tip of blade 20.

Accordingly, the overall end clip can easily be removed from the tip of the blade by a simple manipulation of the latching cover, thereby facilitating the replacement of the wiper blade rubber.

As indicated by the foregoing, an end clip of the automobile wiper blade according to the invention can be advantageously configured to be readily detached from the tip of a wiper blade particularly by releasing the secured state of the latching cover from the clip body and then manually rotating the latching cover, thus enabling replacement of the rubber only (rather than e.g. replacement of the entire blade unit) as needed, thereby reducing the replacement cost of the blade.

While the invention has been described with reference to specific embodiments, modifications and variations may be constructed without departing from the scope of the invention, which is defined in the following claims.

What is claimed is:

1. An end clip of an automobile wiper blade for replacing a rubber thereof, wherein the end clip is installed at both ends of the wiper blade having rubber, vertebra, and spoiler, the end clip comprising:

a clip body that is inserted onto a tip of a wiper blade for enclosing an upper portion of a tip of each of the rubber, vertebra, and spoiler; a latching cover rotatably installed in relation to a hinge coupling portion at an opening formed at an upper surface of the clip body to thereby open and close the opening;

a locking structure in which the latching cover is locked to the clip body while the opening is in a closed state, the locking structure comprises latching hooks that extend at a bottom of both sides of the latching cover and are locked at latching jaws located at an interior of the opening of the did body, and if both sides of the latching cover are inwardly pressed, the latching hooks are withdrawn from the latching jaws for releasing the locked state thereof; and a coupling structure in which the clip body is prevented from being detached from the tip of the blade during the locked state.

2. The end clip as defined in claim 1, wherein the coupling structure comprises:

a latching pin that is extended downward from the inside of the latching cover and is inserted into a hole formed at an upper surface of the rubber during the locked state of the latching cover; and a latching member is upwardly protruded on the vertebra and is stuck at a lateral side of the latching pin during the locked state of the latching cover.

3. The end clip as defined in claim 2, wherein both ends of the latching member having a substantially U-shape is affixed to one or more the vertebras.

* * * * *